Aug. 12, 1947.   N. W. MORSE   2,425,703
COOLANT CONDITIONING SYSTEM
Filed Oct. 23, 1943   2 Sheets-Sheet 2

INVENTOR.
Normand W. Morse,
BY
Stone, Artman & Bisson,
Attys.

Patented Aug. 12, 1947

2,425,703

UNITED STATES PATENT OFFICE 2,425,703

COOLANT CONDITIONING SYSTEM

Normand W. Morse, Chicago, Ill., assignor, by mesne assignments, to Gray-Mills Corporation, Evanston, Ill., a corporation of Illinois Application October 23, 1943, Serial No. 507,374

5 Claims. (Cl. 62—141)

The present invention relates to the conditioning, as cleaning and cooling, of liquid used in machine tool work, such as oil or similar liquid, such liquid being usually referred to as a cutting fluid, and hereinafter also referred to as a coolant.

Continuous production, on the twenty-four hour daily system, involves problems in connection with cutting fluids which make it not only desirable but necessary to cool and maintain cool, as also to clean and maintain clean, the cutting fluid or coolant used. Present economic pressure, whether due to war or other demand, calls for faster production, and such at the highest degree of precision, as is mechanically or physically possible.

The conditioning of cutting fluids or coolant liquids has several advantages, such as removing and avoiding the usual and heretofore prevalent dangers and discomforts of handling hot parts of the machine and the hot pieces of the work or product, as also the dipping of the worker's hands in the hot oil or the like; also the maintaining of the tool at low temperature at the work locus or point so as to have the proper breaking of the chips, shavings or the like with the attendant increase in the life of the tool; also to prevent expansions and contractions of the work and the tool, particularly in long elements which would "throw out" or bow, thus avoiding variations in the dimensions of the finished piece, and narrowing the degree of manufacturing tolerance; also to reduce and prevent decarburization of the hardened materials or materials having a high carbon or other similar constituent content for giving a hard and tough quality to the metal; also to prevent germicidal development in the coolant and the attendant danger of infection to the workers; also to prevent the volatilizing and consequent loss of the coolant liquid, and also to preserve and maintain constant the viscosity or body of the coolant liquid, as also to maintain the same clean, as from any gummy sludge matter which would interfere with the heat transfer of the cooling means.

Whether any or many or all of the above be accomplished by a simple radiation from any oil container, or any type of air cooled radiator, or by circulation of cooling water, or the like, it has been found that by cooling the coolant to a given or predetermined temperature prior to its delivery at the point of work and at a rate commensurate with the temperature of the recycling coolant, after it leaves the work, that if the rate of cooling of the coolant is effected in accordance with the rise in temperature of the returning coolant from the work, and with the rate of flow of the coolant, the best results will be secured.

For example, it may be assumed that the normal temperature of the room, and of the machine, tools and pieces of work, is about 70° F. As work is performed heat is produced. The proper directing of the coolant, which acts as a lubricant, and as a heat absorbing agent, will effectively absorb a major portion of such produced heat, and be carried away to be recycled in the cooling means.

The machine parts, the tool, and the piece of work, may attain a temperature of say 90° F. and if the coolant is so circulated and so cooled as to maintain that temperature, the finished pieces of work will all be dimensionally the same when attaining room temperature, and the parts of the machine and the tool will remain dimensionally constant, since there will be no expansion and contraction due to wide variations of temperature. When the degree of work is light the rate of cooling the coolant will need to be slower and the rate of flow or cycling of the coolant will also be slower, but in the case of a heavier degree of work the rate of cooling the coolant will need to be faster and the rate of flow or cycling of the coolant will also be faster. The temperature examples mentioned herein are given by way of illustration and are not to be taken as limitations.

The principal object of this invention is to provide a portable refrigerating apparatus for not only cooling cutting oils used in conditioning machine tools, but also filtering such oils when they are being circulated from the machine tools back through a cooling apparatus. In flowing cutting oils to machine tools, the cutting oil is delivered by a nozzle to the tool and is then caught in sump. From the bottom of the sump a conduit leads back to the cooling pumping apparatus. The sump catches cuttings from the tool as well as the oil and in varying quantities these cuttings flow down the return conduit to the pumping apparatus. Applicant seeks not only to reduce the used coolant to a selected low heat but insofar as possible to restore the coolant to its proper viscosity and pureness.

Another object of the invention is to provide a novel device of the nature disclosed and which will be portable and easily rolled to and applied to various metal working machines as desired and found necessary.

Other objects, advantages, capabilities, features, and the like are comprehended by the invention as will later appear and as are inherently possessed by the invention.

Referring briefly to the drawings.

Figure 1:
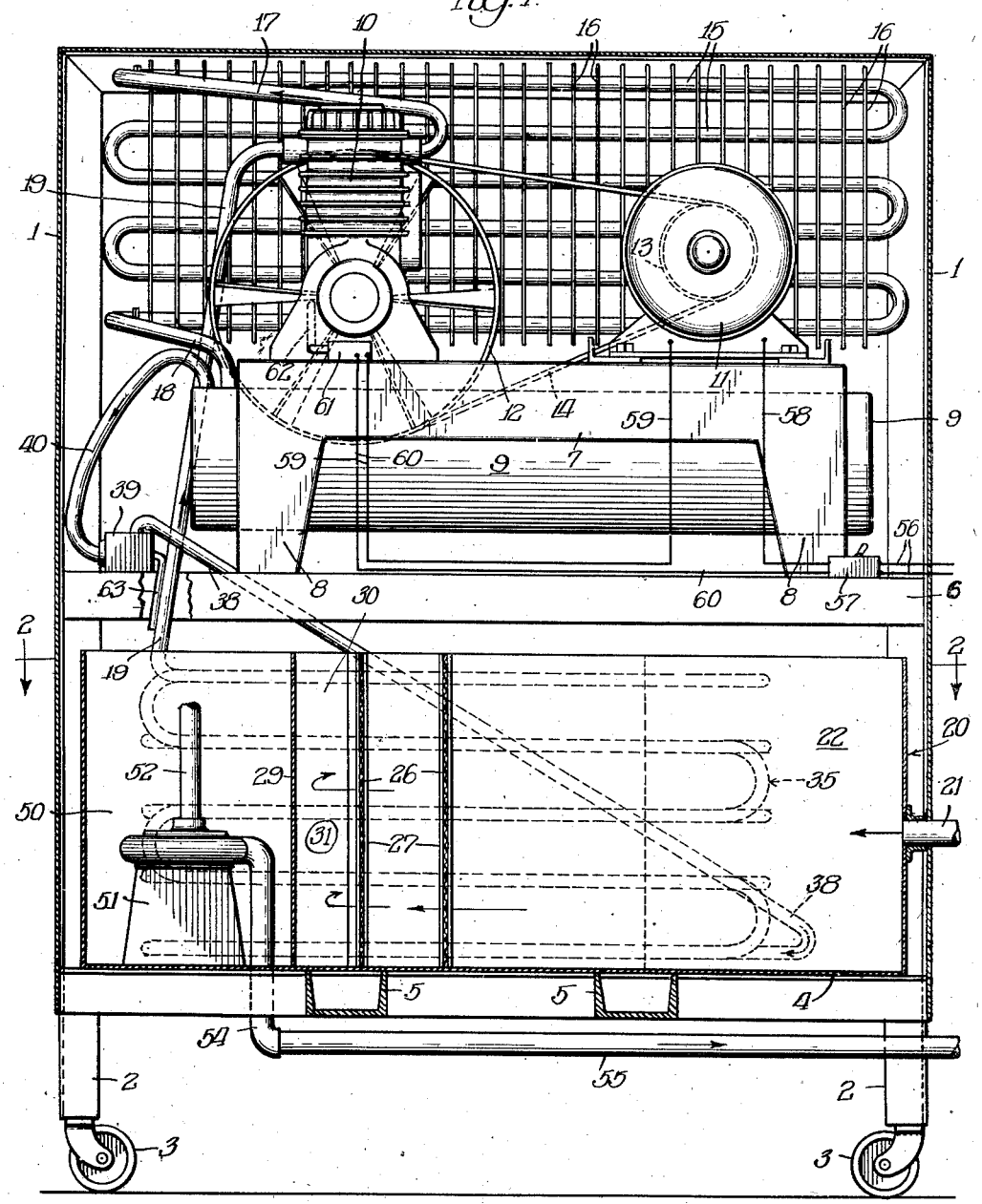
Fig. 1 is a part vertical sectional and part elevational view of a device constructed in accordance with the invention.

Referring now more in detail to the drawings, the embodiment chosen to illustrate the invention is shown in a housing 1 having supporting legs 2 with suitable casters or wheels 3, the legs being suitably fixed to the lower end of the housing 1, as to a bottom portion 4 thereof, the latter having suitable reenforcing members 5.

Intermediate the height of the housing 1 is a floor or suuport 6 upon which is mounted a refrigerating unit comprising a frame or stand 7 having legs 8 standing on or fixed to the floor 6, the frame suitably holding a receiving tank 9 and having mounted on its top a pump 10 and a motor 11 suitably secured to said stand 7, and having pulleys 12 and 13 over which runs a belt 14.

In the upper part of the housing 1 is a suitable condenser coil 15 of serpentine type and carrying heat radiating fins or sheets 16, a refrigerating fluid, such as a gas or vapor, being circulated through the coils 15. From the pump 10 runs a delivery tube or duct 17 to the upper lap of the coil unit 15, and from the lower end of the coil 15 runs a pipe or duct 18 to a receiving tank 9 for delivering the cooled fluid thereto. The pump 10 has an intake pipe or duct 19 as shown in Fig. 1.

In the lower part of the housing 1, as upon the bottom 4, is an open top coolant receiving tank or receptacle 20 having inlet delivery pipe or duct 21 running from the work locus of the machine (not shown). In this tank 20 is provided an upright wall 22 spaced from a side wall 23 and connected at an end thereof to an end wall 24 of the tank 20 so as to provide therebetween a receiving and cleaning chamber 25. At the end of the chamber 25 opposite the end wall 24 is provided one or more vertical screens 26 extending into guideways 27 and 28 attached to the side walls 22 and 23 of the chamber 25, so as to strain or filter the coolant liquid flowing from the chamber 25 and through said screens 26.

Figure 2:
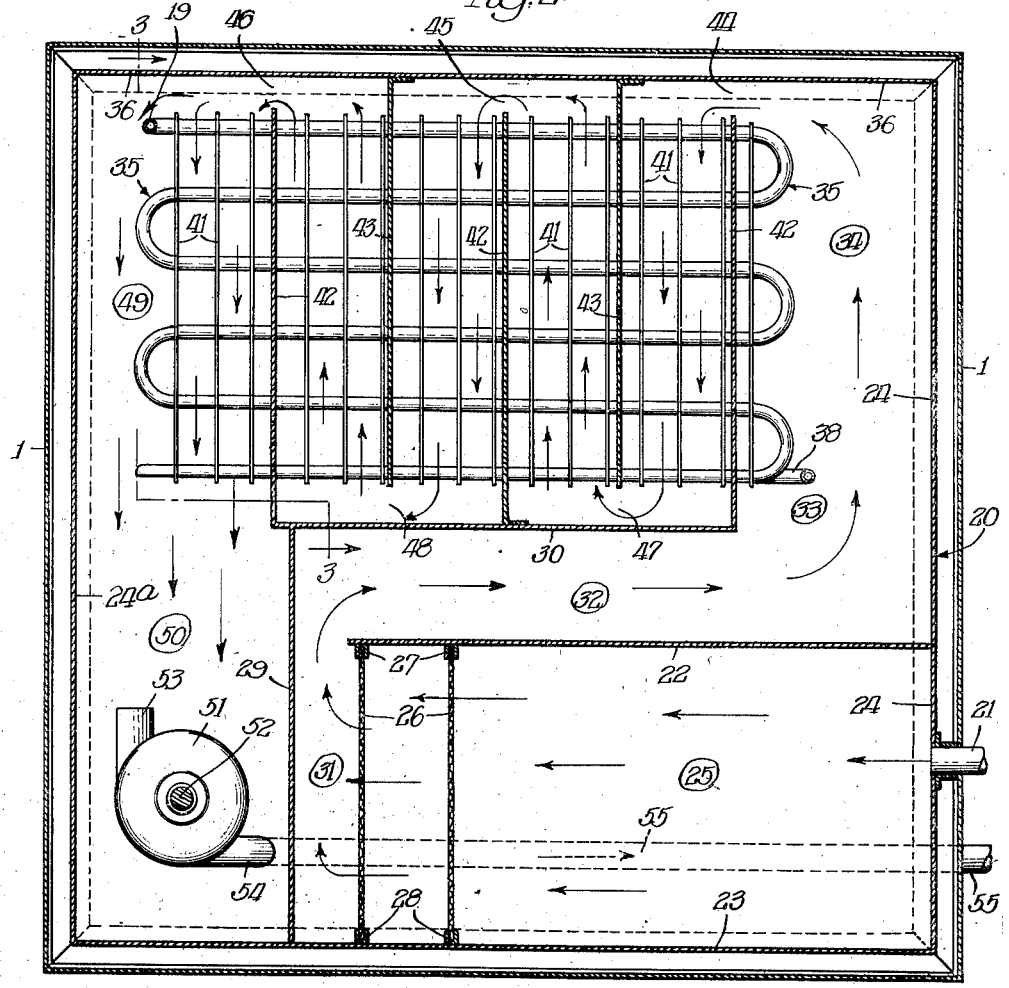
Fig. 2 is a horizontal sectional view taken in a plane represented by line 2—2 in Fig. 1 of the drawings.

Spaced opposite the open end of the chamber 25 is a vertical wall 29 extending from the side wall 23 of the tank 20 and inwardly to a similar vertical wall 30 spaced from the side wall 22 of the chamber 25 so as to define a passage or channel 31—32, as shown in Fig. 2. The wall 30 ends at an end thereof spacedly from the side wall 24 of the tank 20 to provide a port or entry 33 to a chamber or passageway 34 between the wall 24 and a cooling coil unit 35 shown in Fig. 2 and later described.

Figure 3:
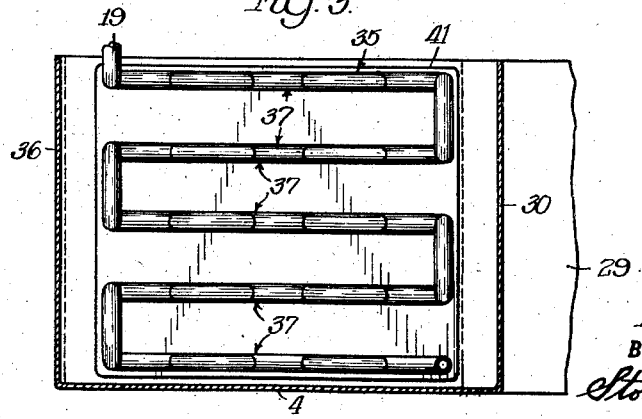
Fig. 3 is a fragmentary vertical sectional view taken in a plane represented by line 3—3 in Fig. 2 of the drawings.

The coil unit 35 is located in the space between the wall 30 and a side wall 36 of the tank 20 (see Fig. 2), and comprises a plurality of vertically spaced layers 37 of coils (see Fig. 3) of the serpentine type (see Fig. 2). This coil unit 35 has an inlet duct 38 connected to a lowermost coil of the unit (see Fig. 1) and running from a suitable thermostatic valve 39 in turn connected by a duct or pipe 40 connected to the receiving tank 9, as shown in Fig. 1, and from an uppermost coil of the unit 35 runs the outlet pipe or duct 19 connected to the intake or inlet of the compressor 10, as shown in Fig. 1.

The coils of the unit 35 have spaced heat radiating fins or sheets 41 (see Figs. 2 and 3) through which pass the laps of the coils of the unit 35. Also, in the space occupied by the unit 35 are spaced vertical walls 42 and 43 of which walls 42 are connected at an end thereof to the wall 30 and spaced at the other end thereof from the side wall 36 to provide for passageways 44, 45 and 46 therebetween, and of which walls 43 are connected at an end thereof to the wall 36 and spaced at the other end thereof from the wall 30 to provide for passageways 47 and 48 therebetween. By said structure the flow of the coolant is tortuously by way of the chamber 34, to and along the spaces between and among the plates 42 and 43 and by way of the passageways 44, 47, 45, 48 and 46, and thence to the chamber 49 at the other end of the unit 35 (see Fig. 2).

From the chamber 49 the liquid flows into a pump chamber 50 located between the wall 29 and the side wall 24a of the receptable 20, in which chamber 50 is a pump 51, which may be of the centrifugal type, suitably driven by way of a shaft 52 connected to a suitable driving means, as a motor (not shown). The pump 51 has an intake 53 in the chamber 50 and a discharge duct 54 connected to a delivery pipe or duct 55 for conducting the cleaned and cooled liquid to the work locus of the machine and tool (not shown).

The motor 11 is connected to an electrical line 56 by way of a manual switch 57 and conductors 58, 59 and 60 of which conductors 59 and 60 pass through a suitable pressure controlled switch 61 having its tube 62 communicating with the pump housing where the pressure of the fluid is substantially the same as in the intake tube 19 (see Figs. 1 and 2), so that the closing and opening of the circuit to the motor 11 will be controlled by the fluid pressure in said pump housing. When that pressure increases the switch means 61 operates to close the motor circuit, and when that pressure decreases the switch 61 will open the circuit.

While the operation of the pump is as above indicated, controlled, more or less directly from the pressure of the fluid in the pump housing, that pressure is dependent upon the temperature of the fluid passing from the coil unit to the intake pipe 19 of the pump. Hence, thermally associated and in contact with the pipe 19 above the liquid level in the coolant receptacle 20 is a capillary tube 63 connected to the valve 39 so that when the return flowing fluid in the duct 19 rises in temperature the valve 39 will open more so that a faster flow of the cooled refrigerant fluid from the tank 9 by way of the ducts 40 and 38 will occur, thus increasing the cooling effect of the coolant in the receptacle 20 by way of the coil unit 35, and, conversely, when the temperature of the fluid passing through the intake duct 19 is lowered, the valve 39 will be closed more so as to reduce the flow of the refrigerant fluid from the tank 9 by way of the duct 40 and the duct 38. The result is to increase or decrease, respectively, the pressure of the intake fluid to the pump and of the fluid in the pump housing, acting on the switch 61 as above described.

In operation the coolant liquid is supplied by the pump 51 by way of the duct 55 to the locus of work. The liquid is then recycled by way of the duct 21 to the chamber 25 where due to a slowing up of the flow of the liquid the suspended particles, such as metal chips, dust, and the like, settle to the bottom of the chamber 25. The screens 26 will hold back any particles or other material that might tend to pass on. The clean liquid then flows by way of the channel 31—32 to the chamber 34 and thence in a tortuous passage by way of the spaces between and among the plates 42 and 43 and the passageways 44, 47, 45 and 48 to the passageway 46 and thence to the pump chamber 50.

As the liquid passes tortuously by the cooling unit 35 it is cooled by reason of contact with the cooling coils thereof and the heat absorbing fins or sheets 41 connected to the coils. The cooling fluid passing through the coils of the cooling unit 35 will thus absorb the heat in the coolant liquid moved toward the pump 51, and as the heated fluid passes from the cooling unit 35 by way of the duct 19 to the compressor 10, its temperature will be effective by way of the capillary tube 63 to effect an operation of the motor 11 and hence the compressor 10, as above described.

The flow of the fluid from the tank 9 is into the lower coil of the unit 35 by way of the ducts 40 and 38 and the valve 39, and out of the upper coil of said unit 35 by way of the duct 19 so that as it passes the capillary tube 63 it will be of substantially the same temperature as the coolant liquid passing past the upper coil where it is connected to the intake duct 19 and where the capillary tube 63 is also connected. This provides for a very sensitive control of the temperature of the coolant liquid.

While I have herein described and upon the drawings shown an illustrative embodiment of the invention it is to be understood that the invention is not limited thereto but comprehends other constructions, arrangements of parts, details, features, and the like without departing from the spirit of the invention.

Having thus disclosed the invention, I claim:

1. Refrigerating apparatus for conditioning sediment bearing coolants comprising a frame, a tank mounted on said frame, a sediment reservoir in said tank, an inlet for admitting sediment bearing coolant into said sediment reservoir, filter means including a wall of said reservoir arranged inside the tank, and a pump in the tank for removing coolant therefrom and thereby drawing liquid through the filter from the sediment tank into the reservoir.

2. Refrigerating apparatus for conditioning sediment bearing coolants comprising a frame, a tank mounted on said frame, a sediment reservoir in said tank, an inlet for admitting sediment bearing coolant into said sediment reservoir, filter means including a wall of said reservoir arranged inside the tank, a pump in the tank for removing coolant therefrom and thereby drawing liquid through the filter from the sediment tank into the reservoir, and means in the tank for cooling filtered coolant.

3. Refrigerating apparatus for conditioning sediment bearing coolants comprising a frame, a tank mounted on said frame, a sediment reservoir in said tank, an inlet for admitting sediment bearing coolant into said sediment reservoir, filter means including a wall of said reservoir arranged inside the tank, and a pump in the tank for removing coolant therefrom and thereby drawing liquid through the filter from the sediment tank into the reservoir, said filters being removable for cleaning purposes.

4. Refrigerating apparatus for conditioning sediment bearing coolants comprising a frame, a tank mounted on said frame, a sediment reservoir in said tank, an inlet for admitting sediment bearing coolant into said sediment reservoir, filter means including a wall of said reservoir arranged inside the tank, a pump in said tank for removing fluid, a tortuous passageway positioned between said pump and said filter along which coolant may flow, and means in the tortuous passageway for cooling any fluid therein.

5. Refrigerating apparatus for conditioning sediment bearing coolants comprising a frame, a tank mounted on the lower part of said frame, a refrigerating apparatus mounted in the upper part of said frame, a sediment reservoir positioned in one corner of said tank, a pump for removing fluid from said tank positioned in an adjacent corner, a filter including a wall of said reservoir arranged inside the tank, a series of baffles positioned between said filter and said pump so as to form a tortuous path for liquid from said filters to said pump, and evaporator coils functioned by said refrigerating apparatus disposed in said tortuous path.

NORMAND W. MORSE.

REFERENCES CITED

The following references are of record in the file of this patent:

UNITED STATES PATENTS

| Number | Name | Date |
|---|---|---|
| 2,256,971 | Chamberlain | Sept. 23, 1941 |
| 2,136,813 | Dolison | Nov. 15, 1938 |
| 1,891,714 | Jordan | Dec. 20, 1932 |
| 2,217,253 | Hughes | Oct. 8, 1940 |
| 1,828,970 | Huntley | Oct. 27, 1931 |